United States Patent [19]

Zimmerman et al.

[11] 4,442,237

[45] Apr. 10, 1984

[54] NOVEL AROMATIC AMIDE POLYOLS FROM THE REACTION OF PHTHALIC ACID RESIDUES, ALKYLENE GLYCOLS AND AMINO ALCOHOLS

[75] Inventors: Robert L. Zimmerman, Austin; Kenneth G. McDaniel, Round Rock, both of Tex.

[73] Assignee: Texaco Inc., White Plains, N.Y.

[21] Appl. No.: 443,726

[22] Filed: Nov. 22, 1982

[51] Int. Cl.³ .............................................. C08G 18/14
[52] U.S. Cl. ................................... 521/131; 252/182; 521/48.5; 521/164; 528/291; 528/308.1; 560/89; 560/92; 560/93
[58] Field of Search ...................... 521/164, 131, 48.5; 528/291, 308.1; 560/89, 92, 93; 252/182

[56] References Cited

U.S. PATENT DOCUMENTS

| | | | |
|---|---|---|---|
| 3,647,759 | 3/1972 | Walker | 521/172 |
| 4,048,104 | 9/1977 | Svoboda et al. | 521/159 |
| 4,100,354 | 7/1978 | Owen | 521/173 |
| 4,223,068 | 9/1980 | Carlstrom et al. | 521/171 |
| 4,237,238 | 12/1980 | DeGuiseppi et al. | 521/172 |
| 4,246,365 | 1/1981 | Wiedemann et al. | 521/172 |

*Primary Examiner*—Maurice J. Welsh
*Attorney, Agent, or Firm*—Robert A. Kulason; Kenneth R. Priem; David L. Mossman

[57] ABSTRACT

Mixtures of aromatic polyols containing tertiary amine and ester functionalities suitable for use in rigid foams prepared by reacting a phthalic acid residue with an alkylene glycol and an amino alcohol are described. These novel polyols may be blended with conventional polyols to yield rigid polyurethane foams with better flammability resistance as compared with foams made from conventional polyols alone.

18 Claims, No Drawings

NOVEL AROMATIC AMIDE POLYOLS FROM THE REACTION OF PHTHALIC ACID RESIDUES, ALKYLENE GLYCOLS AND AMINO ALCOHOLS

CROSS-REFERENCES TO RELATED APPLICATIONS

This application is related to U.S. patent application Ser. No. 443,822, filed Nov. 22, 1982, which concerns polyols made from the reaction of phthalic acid residues and amino alcohols, the reaction product of which is subsequently reacted with alkylene oxides. This application is further related to U.S. patent application Ser. No. 443,779, filed Nov. 22, 1982, which concerns the preparation of polyols by the reaction of phthalic acid residues with dibasic acids and alkylene glycols and U.S. patent application Ser. No. 443,848, filed Nov. 22, 1982, which concerns the use of polyethylene terephthalate waste streams which contain mono and polyethylene glycols as polyol extenders, all filed of even date.

BACKGROUND OF THE INVENTION

1. Field of the Invention

The invention relates to polyols for rigid polyurethane foams and more particularly relates to aromatic tertiary amino polyols made from phthalic acid residues which impart improved fire resistance to the rigid polyurethane foams they are employed in.

2. Description of Other Relevant Compounds in the Field

It is known to prepare foam from polyurethanes by the reaction of a polyisocyanate, a polyol and a blowing agent such as a halogenated hydrocarbon, water or both, in the presence of a catalyst. One particular area of polyurethane technology is based upon rigid polyurethane foams.

The art is replete with a wide variety of polyols useful as one of the main components in preparing polyurethanes such as polyurethane foams. As an example, U.S. Pat. No. 2,965,615 suggests use of co-polymers of alkenylsubstituted aromatic compounds such as styrene, and ethylenically unsaturated monohydric alcohols such as allyl alcohol as a useful resinous polyol in urethane production. Also disclosed as useful polyol sources are alkoxylated reaction products of the above co-polymers.

Further, U.S. Pat. No. 4,094,828 describes how a polyol combination comprising a co-polymer of allyl alcohol and styrene and a polyether polyol provides for rigid polyurethane foams possessing unusual dimensional stability and heat distortion properties. Amino polyols may be modified with epoxy resin and alkylene oxides according to the invention disclosed in U.S. Pat. No. 4,309,532. These modified polyols produce rigid polyurethane foams that have higher heat distortion temperatures and better low temperature properties than foams made with polyols not modified in such a fashion.

Rigid foams generally have good insulative properties and are thus desirable for use in building insulation. As with all building materials, it is desirable to provide rigid foams that are as fire resistant as possible. One approach to this goal is to modify the polyol.

Polyisocyanurate foams are a type which are considered to be fire resistant and show low smoke evolution on burning. However, polyisocyanurate foams tend to be brittle or friable. Various types of polyols have been devised to lower the foam friability, but what frequently happens is that the fire and smoke properties of the polyisocyanurate foam deteriorate. Thus, a fine balance exists between the amount and type of polyol one adds to a polyisocyanurate foam formulation in order to maintain maximum flame and smoke resistance while at the same time reach an improvement in foam friability. U.S. Pat. Nos. 4,039,487 and 4,092,276 describe attempts at this fine balance, although each has its disadvantages.

Scrap polyalkylene terephthalate, such as polyethylene terephthalate (PET) is known to be incorporated into polyurethanes. For example, U.S. Pat. No. 4,048,104 relates that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another case where phthalic acid residues are employed is outlined in U.S. Pat. No. 4,246,365 where polyurethanes are made from polyesters containing at least two hydroxyl groups and phthalic acid residues.

More relevant to the compounds of this invention is the solution proposed in U.S. Pat. No. 4,237,238. In this patent, a polyol mixture is prepared by the transesterification of a residue from the manufacture of dimethyl terephthalate with a glycol, which is then used to produce polyisocyanurate foams having a combination of a high degree of fire resistance with low smoke evolution, low foam friability and high compressive strength. The preparation of such a polyol mixture (from ethylene glycol and dimethyl terephthalate esterified oxidate residue) is described in U.S. Pat. No. 3,647,759. J. M. Huges and John Clinton, in the Proceedings of the S.P.I. 25th Annual Urethane Division Technical Conference, Scottsdale, Ariz. (October 1979), described other foams prepared from the polyols of U.S. Pat. No. 3,647,759.

Another type of polyisocyanurate foam employs a polyol blend using both amide diols and primary hydroxyl polyols to give a foam having a high reaction exotherm, making it particularly suited to the preparation of polyisocyanurate foam laminates, according to U.S. Pat. No. 4,246,364.

There is still a need for a rigid polyurethane foam that has a high flame resistance. Part of the problem with the polyols of U.S. Pat. No. 3,647,759 is that they are not very compatible with trichlorofluoromethane, the gas entrapped in closed-cell rigid foams, which accounts for the excellent insulating properties of these foams.

SUMMARY OF THE INVENTION

The invention concerns a mixture of aromatic polyols having amine and ester functionalities for use in preparing rigid foams, being produced by the process comprising reacting a phthalic acid residue with an alkylene glycol and a tertiary amino alcohol to form a mixture of aromatic polyols with amine and ester functionalities.

DETAILED DESCRIPTION OF THE PREFERRED EMBODIMENTS

In general, it has been discovered that rigid polyurethane foams having improved resistance to fire may be made using a mixture of aromatic amino polyols and the aromatic polyols of this invention. In addition, such a polyol mixture is compatible with the trichlorofluoromethane blowing agent. The novel aromatic amino polyols are made by using a phthalic acid residue. This may be any waste or scrap residue from the manufacture of phthalic acid, dimethyl terephthalate, and polyethylene terephthalate. The residue must contain compounds which have the moiety

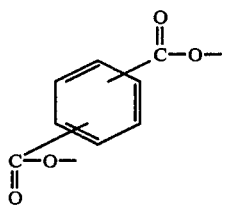

One such suitable residue is the dimethyl terephthalate (DMT) residue described in U.S. Pat. No. 3,647,759, incorporated herein by reference. However, the co-reactants comprise not simply ethylene glycol as in U.S. Pat. No. 3,647,759, but rather both an amino alcohol and an alkylene glycol. The product of this reaction contains the novel mixture of aromatic polyols having amide and ester functionalities.

The term "DMT residue" refers to the purged residue which is obtained during the manufacture of DMT in which p-xylene is oxidized and the crude oxidation product is then esterified with methanol to yield the desired product in a reaction mixture along with a complex mixture of by-products. The desired DMT is removed from the reaction mixture with the volatile methyl p-toluate by-product by distillation leaving a residue. The DMT and methyl p-toluate are separated. Some of the residue is purged from the process while the remainder of the residue and the methyl p-toluate are recycled for oxidation. It is this purged residue which is reacted with the amino alcohols to yield useful polyol products.

U.S. Pat. No. 3,647,759 describes in detail the residue set forth above and characterizes its properties. Residues from the manufacture of polyethylene terephthalate would also be expected to be useful in making polyols by this process.

These DMT residues may contain DMT, substituted benzenes, polycarbomethoxy diphenyls, benzyl esters of the toluate family, dicarbomethoxy fluorenone, carbomethoxy benzocoumarins and carbomethoxy polyphenyls. The substituted benzenes, dicarbomethoxy fluorenone and carbomethoxy benzocoumarins are also present in small amounts. Dimethyl terephthalate may be present in amounts ranging from 6 to 60% of the DMT residue. Hercules, Inc., Wilmington, Del., sells these DMT residues under the tradename of TERATE® 101. Hercules also sells TERATE 200 series resins which are DMT resins modified with a glycol as seen in U.S. Pat. Nos. 4,237,238 and 3,647,759. Similar DMT residues having a different composition but still containing the aromatic acids are also sold by DuPont.

It is expected that useful novel aromatic polyol mixtures may be made with polyethylene terephthalate (PET) in place of the DMT residue used in the first step. These materials are also known as PET still bottoms. The reactions would proceed as usual and an aromatic polyol having amine and ester functionalities would result.

The amino alcohols should have at least one tertiary amino group and at least one hydroxyl function. Preferably, the amino alcohols can be represented by the formula

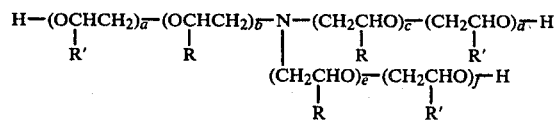

where R and R' are hydrogen or lower alkyl of one to four carbon atoms except that R does not equal R'; a,b,c,d,e and f are from zero to 4 except that the sums a+b, c+d and e+f range from 1 to 4.

Amines useful in the practice of this invention include triethanolamine, tripropanolamine, diethanolmonopropanolamine and dipropanolmonoethanolamine. Di-tertiary amino alcohols could also be useful. Also included in this definition is THANOL® SF-265, an aminopolyol made by Texaco Chemical Company by adding two moles of propylene oxide to one mole of triethanolamine. Mixtures of tertiary amino alcohols are also suitable. The preferred equivalents ratios of phthalic acid residue equivalents to equivalents of glycol and amino alcohol are 1:1 to 3:0.5 to 3. This is the ratio of saponification equivalents of the phthalic acid residue to the hydroxyl equivalents of the glycol and amino alcohol.

The second co-reactant is an alkylene glycol. Preferably, the alkylene glycol has the formula

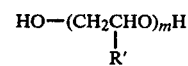

where R' is hydrogen or lower alkyl of one to four carbon atoms and m is from 1 to 3. Glycols which meet this definition and which would be suitable are ethylene glycol, propylene glycol (1,2-propylene glycol), diethylene glycol and dipropylene glycol, among others.

The proportions of the reactants should be such as to give a resulting mixture of aromatic polyols which have an average OH (hydroxyl) number within the desired range. What actually forms the "polyol" of this invention is a mixture of polyols having both amine and ester functions, even though the mixture is referred to sometimes as a singular "polyol".

The reaction of phthalic acid residues with tertiary amino alcohols and alkylene glycols to give polyol mixtures having ester and tertiary amino functions may be diagrammed roughly as follows, where Ar represents the balance of the aromatic phthalic acid-type residue and R is alkyl:

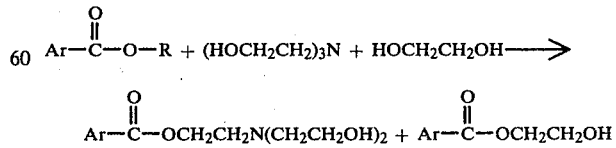

The temperature of the reaction should be from about ambient to about 300° C., with the preferred temperature range being from about 200° to 240° C. Preferably, the pressure runs from about atmospheric to 2 atmospheres. Generally, the reaction needs heat to proceed. The polyol should have a hydroxyl number in the range of 150 to 600, with an especially preferred hydroxyl number range of 300 to 500.

When these polyols are blended with conventional polyols, polyurethane foams with better fire resistance are produced as compared with foams made only with the conventional polyols. The polyols of this invention can also be used to prepare isocyanurate foams which have good fire resistance.

There is better compatibility of the polyols of this invention with trichlorofluoromethane as compared with the polyols of the type presented in U.S. Pat. No. 3,647,759. Trichlorofluoromethane, sold under the tradename FREON® R11B, a conventional blowing agent, is the gas entrapped in closed-cell rigid foams which accounts for the excellent insulating properties of these foams. Generally, the polyol mixtures of this invention are useful as polyol extenders and can replace to some extent more expensive polyols.

The polyols of this invention may be used as the sole polyol component in a polyurethane foam formulation or, preferably, as part of a blend of polyols. These polyols may also be used in polyisocyanurate foams.

The second constituent of the overall polyol combination found particularly useful in preparing rigid polyurethane foams is a polyether polyol having a hydroxyl number of 200–800. Usually the polyether polyol comprises 0–95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2–6.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, and trimethylolpropane. Diamino alcohols would also be useful, such as compounds of the formula (HOR")$_2$NCH$_2$CH$_2$N(R"OH)$_2$ where R" is an alkyl group.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

Especially preferred as the second polyol constituent are the nitrogen-containing polyether polyols described in U.S. Pat. Nos. 3,297,597 and 4,137,265, incorporated by reference herein. These particularly preferred polyols are marketed by Texaco Chemical Company as THANOL® R-350-X and THANOL R-650-X polyols. These polyols are prepared by reacting from 2 to 3 moles of propylene oxide with one mole of the Mannich reaction product of a mole of phenol or nonylphenol with one or two moles of diethanolamine.

The final polyol combination more preferably comprises 0–95 percent by weight of said polyether polyol and 100–5 percent by weight of aromatic amide polyol. Although the aromatic polyols of this invention may be used alone, it is preferred that they be present in an amount of from 30 to 70 weight percent of the polyol blend. The polyol combination in many instances has a total hydroxyl number ranging from about 200 to about 600. A preferred range is a hydroxyl number of from 300 to 500.

Any aromatic polyisocyanate may be used in the practice of making the foam of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenyl diisocyanate isomers with the remainder being polymethylene polyphenyl diisocyanates having higher functionalities and higher molecular weights. Typical of these are polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoroethane, 1,1-difluoro-1,2,2-trichloroethane, chloropentafluoroethane, and the like. Other useful blowing agents include low-boiling hydrocarbons such as butane, pentane, hexane, cyclohexane, and the like. See U.S. Pat. No. 3,072,582, for example. The polyols of this invention are quite compatible with fluorocarbon blowing agents unlike some of the prior art polyols which are made from DMT residues.

Surfactant agents, better known as silicone oils, are added to serve as a cell stabilizer. Some representative materials are sold under the names of SF-1109, L-520, L-521 and DC-193 which are, generally, polysiloxane polyoxyalkylene blocked co-polymers, such as those disclosed in U.S. Pat. Nos. 2,834,748; 2,917,480; and 2,846,458, for example.

Should further fire retardancy be required for the polyurethane foam, two types of fire retardants are available; those that are incorporated by mere mechanical mixing and those that become chemically bound in the polymer chain. Representative of the first type are tris(chloroethyl)phosphate, tris(2,3-dibromopropyl)-phosphate, diammonium phosphate, various halogenated compounds and antimony oxide. Representative of the chemically bound type are chlorendic acid derivatives, and various phosphorous-containing polyols.

The catalysts which may be used to make the foams of this invention are well known. There are two general types of catalyst, tertiary amines and organometallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in this invention are triethylenediamine, tetramethylethylenediamine, triethylamine, tripropylamine, tributylamine, triamylamine, pyridine, quinoline, dimethylpiperazine, dimethylhexahydroaniline, piperazine, N-ethylmorpholine, 2-methylpiperazine, dimethylaniline, nicotine, dimethylaminoethanol, tetramethylpropanediamine and methyltriethylenediamine. Useful organometallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organometallic compound are often used together in the polyurethane reaction.

The rigid polyurethane foams prepared here can be made in one step by reacting all the ingredients together at once (one-shot process) or the rigid foams can be made by the so-called "quasi-prepolymer method." In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

In a preferred embodiment the amount of polyol combination is used such that the isocyanato groups are present in the foam in at least an equivalent amount, and preferably in slight excess, compared with the free hydroxyl groups. Preferably, the ingredients will be proportional so as to provide for about 1.05 to about 8.0 mole equivalents of isocyanato groups per mole equivalent of hydroxyl groups.

The invention will be illustrated further with respect to the following specific examples, which are given by way of illustration and not given as limitations on the scope of this invention. The synthesis of the polyols of this invention will be presented along with examples of how these polyols are used to prepare foams with improved qualities.

EXAMPLE I

Preparation of Polyol

In a one liter three-necked flask equipped with a mechanical stirrer, thermometer and distillation head was placed 300 grams of polyethylene terephthalate still bottoms[1], 156.2 g of diethylene glycol, 73.1 g of triethanolamine, 10 g of water and 15 g of magnesium silicate. This mixture was then heated to 240° C. and held for four hours. During this period 50 g of material was distilled. The material left in the pot was then filtered. The resulting polyol was clear and had the following properties:

| | |
|---|---|
| Hydroxyl number | 268 |
| Water, wt. % | 0.43 |
| Acid number | 5.61 |
| Total amine, meq/g | 0.99 |

[1]The polyethylene terephthalate still bottoms had the following properties:

| | |
|---|---|
| Hydroxyl number | 169 |
| Acid number | 3.39 |
| Saponification value | 414 |

EXAMPLE II

The same procedure as in Example I was used, except the reaction was held at 240° C. for six hours and the charge was:

| | |
|---|---|
| Polyethylene terephthalate still bottoms, g | 300 |
| Diethylene glycol, g | 234.3 |
| Triethanolamine, g | 73.1 |
| Magnesium silicate, g | 15 |

The resulting polyol had the following properties:

| | |
|---|---|
| Hydroxyl number | 350 |
| Acid number | 3 |
| Total amines | 0.9 |
| Water, wt. % | 0.01 |

EXAMPLE III

The same procedure as in Example I was used, except it was held six hours at 240° C. and the charge was as follows:

| | |
|---|---|
| Polyethyleneterephthalate still bottoms, g | 300 |
| Diethylene glycol, g | 156.2 |
| Triethanolamine, g | 156.2 |
| Magnesium silicate | 15 |

The product polyol had the following physical properties:

| | |
|---|---|
| Hydroxyl number | 154 |
| Acid number | 9 |
| Total amine | 1.9 |
| Water, wt. % | 0.2 |

EXAMPLE IV

The same procedure as in Example III was used, except that the charge was as follows:

| | |
|---|---|
| Polyethyleneterephthalate still bottoms, g | 300 |
| Diethylene glycol, g | 156.2 |
| THANOL ® SF-265, g | 130 |
| Magnesium silicate, g | 15 |

The product polyol had the following physical properties:

| | |
|---|---|
| Hydroxyl number | 376 |
| Acid number | 1 |
| Total amine | 0.9 |
| Water, wt. % | 0.2 |

EXAMPLE V

The same procedure as in Example III was used, except the charge was as follows:

| | |
|---|---|
| Polyethyleneterephthalate still bottoms, g | 300 |
| Diethylene glycol, g | 234.3 |
| THANOL SF-265, g | 130 |
| Magnesium silicate, g | 15 |

The product polyol had the following physical properties:

| | |
|---|---|
| Hydroxyl number | 444 |
| Acid number | 2 |
| Total amine | 0.8 |
| Water, wt. % | 0.03 |

EXAMPLE VI

The same procedure as in Example III was used, except the charge was as follows:

| | |
|---|---|
| Polyethyleneterephthalate still bottoms, g | 300 |
| Diethylene glycol | 156 |
| THANOL SF-265 | 275.6 |
| Magnesium silicate | 15 |

The product polyol had the following physical properties:

| | |
|---|---|
| Hydroxyl number | 351 |
| Acid number | 3 |
| Water, wt. % | 0.2 |
| Total amine | 1.1 |

EXAMPLE VII

A five-gallon kettle was charged with ten pounds of polyethyleneterephthalate still bottoms[1], 7.32 pounds of dipropylene glycol, 3.20 pounds of THANOL SF-265 and 230 g of magnesium silicate. The reaction was heated to 230° C. and held for six hours. During this period 1.13 g of material distilled. The polyol was then discharged through a filter coated with "Hyflow" filter aid.

The polyethyleneterephthalate still bottoms had the following properties:

| | |
|---|---|
| Hydroxyl number | 236 |
| Acid number | 3 |
| Saponification value | 306 |

The product polyol had the following physical properties:

| | |
|---|---|
| Hydroxyl number | 418 |
| Acid number | 2.6 |
| Water, wt. % | 0.03 |
| Total amine, meq/g | 0.79 |

EXAMPLE VIII

The same procedure was in Example VII was used, except 5.79 pounds of diethylene glycol was used instead of 7.32 pounds of dipropylene glycol. The product polyol had the following physical properties:

| | |
|---|---|
| Hydroxyl number | 438 |
| Acid number | 2 |
| Water, wt. % | 0.1 |
| Total amine, meq/g | 0.7 |

EXAMPLE IX

This example illustrates that the polyols of this invention can be used with aromatic-amino polyols.

| | A | B | C | D | E | F | G |
|---|---|---|---|---|---|---|---|
| THANOL ® R-650-X[1] | 36.3 | 27.3 | 26.3 | 28.5 | 26.1 | 25.5 | 26.1 |
| Polyol Example I | — | 11.7 | — | — | — | — | — |
| Polyol Example II | — | — | 11.3 | — | — | — | — |
| Polyol Example III | — | — | — | 12.2 | — | — | — |
| Polyol Example IV | — | — | — | — | 11.2 | — | — |
| Polyol Example V | — | — | — | — | — | 10.9 | — |

EXAMPLE IX-continued

This example illustrates that the polyols of this invention can be used with aromatic-amino polyols.

| | A | B | C | D | E | F | G |
|---|---|---|---|---|---|---|---|
| Polyol Example VI | — | — | — | — | — | — | 11.2 |
| Fire Retardant XNS-50054.2[2] | 2.0 | 2.0 | 2.0 | 2.0 | 2.0 | 2.0 | 2.0 |
| Water | 0.3 | 0.3 | 0.3 | 0.3 | 0.3 | 0.3 | 0.3 |
| Trichlorofluoromethane | 13 | 13 | 13 | 13 | 13 | 13 | 13 |
| Silicone L-5420[3] | 0.5 | 0.5 | 0.5 | 0.5 | 0.5 | 0.5 | 0.5 |
| FOMREZ ® UL-32[4] | 0.01 | 0.01 | 0.01 | 0.01 | 0.01 | 0.01 | 0.02 |
| MONDUR ® MR[5] | 47.9 | 45.2 | 46.6 | 43.5 | 46.2 | 47.7 | 46.2 |
| NCO/OH index | 1.10 | 1.10 | 1.10 | 1.10 | 1.10 | 1.10 | 1.10 |
| Density, pcf | 1.74 | 1.61 | 1.63 | 1.64 | 1.61 | 1.64 | 1.63 |
| K-factor | 0.13 | 0.11 | 0.11 | 0.12 | 0.11 | 0.11 | 0.11 |
| Compressive strength | | | | | | | |
| with rise, psi | 39 | 30 | 25 | 23 | 29 | 35 | 31 |
| cross rise, psi | 14 | 9 | 11 | 9 | 8 | 9 | 9 |
| Friability, wt. % loss | 5 | 2 | 1 | 1 | 1 | 3 | 2 |
| Heat distortion, °C. | 169 | 159 | 136 | 163 | 145 | 138 | 136 |
| Closed cells, % | 92 | 93 | 93 | 92 | 92 | 92 | 92 |
| Butler Chimney | | | | | | | |
| wt. % retained | 36 | 60 | 56 | 51 | 67 | 62 | 68 |
| seconds to extinguish | 41 | 19 | 19 | 18 | 11 | 19 | 13 |
| flame height, inches | >11 | >11 | >11 | >11 | >11 | >11 | >11 |

[1]Amino aromatic polyol, hydroxyl number 450, sold by Texaco Chemical Co., described in U.S. Pat. No. 4,137,265.
[2]A fire retardant sold by Dow Chemical Co.
[3]A silicone surfactant sold by Union Carbide Corp.
[4]A tin catalyst sold by Witco Chemical Corp.
[5]A polymeric isocyanate sold by Mobay Chemical Corp.

It may be seen that better Butler Chimney results are obtained with the polyols of this invention as evidenced by both the "percent weight retained" and "seconds to extinguish" figures. When the polyols of this invention are blended with THANOL R-650-X, the weight retained was higher and the seconds to extinguish fewer than when THANOL R-650-X was employed as the only polyol (Foam A).

EXAMPLE X

This example illustrates the use of these polyols for isocyanurate foams.

| | H | I |
|---|---|---|
| Polyol Example V | 13.6 | — |
| Polyol Example VI | — | 16.1 |
| DC-193[1] | 0.9 | 0.9 |
| Trichlorofluoromethane | 13 | 13 |
| DABCO ® TMR-2[2] | 1.0 | 1.0 |
| DMP-30[3] | 0.3 | 0.3 |
| MONDUR ® MR | 71.2 | 68.7 |
| NCO/OH index | 5.0 | 5.0 |
| Reaction Profile | | |
| Cream time (sec) | 4 | 5 |
| Tack free time (sec) | 16 | 16 |
| Rise time (sec) | 35 | 40 |
| Physical Properties | | |
| Density, pcf | 1.86 | 1.78 |
| K-factor | 0.12 | 0.12 |
| Compressive strength | | |
| with rise | 33 | 29 |
| cross rise | 12 | 11 |
| Friability, wt. % loss | 32 | 32 |
| Heat distortion, °C. | >225 | >225 |
| Closed cells, % | 89 | 94 |
| Butler Chimney | | |
| wt. % retained | 93 | 92 |
| seconds to extinguish | 10 | 10 |
| flame height, inches | 4 | 4.5 |

[1]A silicone surfactant sold by Dow-Corning Corp.
[2]A quaternary ammonium carboxylate catalyst sold by Air Products and Chemicals, Inc.
[3]2,4,6-tris-(N,N—dimethylaminomethyl)phenol.

EXAMPLE XI

This example illustrates the better Freon ® compatibility of the polyols of this invention.

| | H | I |
|---|---|---|
| TERATE ® 203[1] | 15 | — |
| Polyol Example VI | — | 15 |
| Trichlorofluoromethane | 5 | 5 |
| Observations | Non-homogeneous | Homogeneous |

[1]TERATE 203 is a DMT resin modified with a glycol according to U.S. Pat. No. 3,647,759, sold by Hercules, Inc.

The examples have demonstrated that the polyols of this invention are more compatible with fluorocarbon blowing agents than are other phthalic residue polyols and impart improved fire resistant properties to the resultant foam as well. Many modifications may be made in the polyols of this invention and their method of production without departing from the spirit and scope of the invention which is defined only in the appended claims. For example, it may be found that polyols made from certain phthalic acid residues, alkylene glycols and amino alcohols, or made at a certain temperature, would have advantageous properties such as optimized fire resistance of the foams.

We claim:

1. A mixture of aromatic polyols having amine and ester functionalities for use in preparing rigid foams, being produced by the process comprising reacting a residue selected from the group consisting of a dimethyl terephthalate manufacturing residue and a polyethylene terephthalate manufacturing residue, with an alkylene glycol and a tertiary amino alcohol.

2. The mixture of aromatic polyols of claim 1 in which the tertiary amino alcohol has the formula

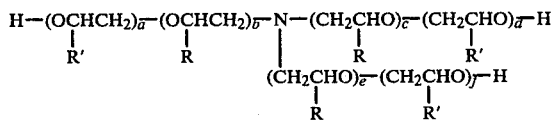

where R and R' are hydrogen or lower alkyl of one to four carbon atoms except that R does not equal R'; a,b,c,d,e and f are from zero to 4 except that the sums a+b, c+d and e+f range from 1 to 4.

3. The mixture of aromatic polyols of claim 1 in which the alkylene glycol has the formula

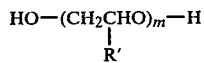

where R' is hydrogen or lower alkyl of one to four carbon atoms and m is from 1 to 3.

4. The mixture of aromatic polyols of claim 1 in which the reaction to make the polyol is conducted at a temperature in the range between ambient and 300° C.

and at a pressure between atmospheric and 2 atmospheres.

5. The mixture of aromatic polyols of claim 1 in which the resulting mixture of aromatic polyols has an average hydroxyl number in the range between 150 and 600.

6. A mixture of aromatic polyols having amine and ester functionalities for use in preparing rigid foams, being produced by the process comprising reacting a. a residue selected from the group consisting of a dimethyl terephthalate manufacturing residue and a polyethylene terephthalate manufacturing residue, b. an alkylene glycol having the formula

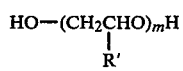

where R' is hydrogen or lower alkyl of one to four carbon atoms and m is from 1 to 3, and c. a tertiary amino alcohol of the formula

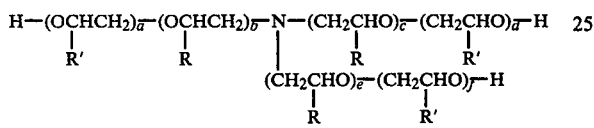

where R and R' are hydrogen or lower alkyl of one to four carbon atoms except that R does not equal R'; a,b,c, d,e and f are from zero to 4 except that the sums a+b, c+d and e+f range from 1 to 4 at a temperature in the range between ambient and 300° C. and at a pressure between atmospheric and 2 atmospheres to produce a mixture of polyols which has an average hydroxyl number in the range between 150 and 600.

7. A method for making a mixture of aromatic polyols having amine and ester functionalities for use in preparing rigid foams, comprising reacting a residue from the manufacture of polyethylene terephthalate, with an alkylene glycol and a tertiary amino alcohol.

8. The method of claim 7 in which the alkylene glycol has the formula

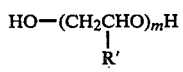

where R' is hydrogen or lower alkyl of one to four carbon atoms and m is from 1 to 3.

9. The method of claim 7 in which the amino alcohol has the formula

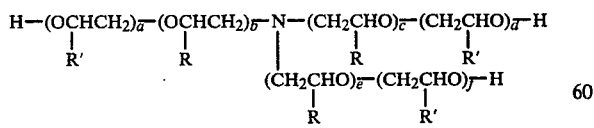

where R and R' are hydrogen or lower alkyl of one to four carbon atoms except that R does not equal R'; a,b,c,d,e and f are from zero to 4 except that the sums a+b, c+d and e+f range from 1 to 4.

10. The method of claim 7 in which the reaction is conducted at a temperature in the range between ambient and 300° C. and at a pressure between atmospheric and 2 atmospheres.

11. The method of claim 7 in which the resulting mixture of aromatic polyols has an average hydroxyl number in the range between 150 and 600.

12. A rigid polyurethane foam obtained by reacting in the presence of a blowing agent and a catalyst of polyurethane formation, an organic polyisocyanate and a mixture of aromatic polyols having tertiary amine and ester functionalities which is the reaction product of a residue selected from the group consisting of a dimethyl terephthalate manufacturing residue and a polyethylene terephthalate manufacturing residue, an alkylene glycol and an amino alcohol.

13. The rigid foam of claim 12 in which the blowing agent is trichlorofluoromethane.

14. A rigid polyurethane foam obtained by reacting in the presence of a blowing agent and a catalyst of polyurethane formation, an organic polyisocyanate and an aromatic polyol blend comprising a. from about 5 to 100 percent by weight of a mixture of aromatic polyols having tertiary amine and ester functionalities made by the process comprising reacting (1) a residue taken as a waste from the production of one of the group consisting of phthalic acid, dimethyl terephthalate and polyethylene terephthalate, (2) an alkylene glycol having the formula

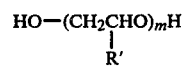

where R' is hydrogen or lower alkyl and m is from 1 to 3, and (3) a tertiary amino alcohol of the formula

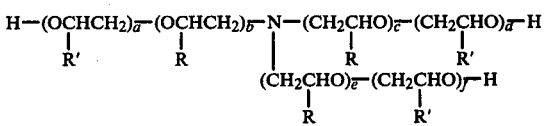

where R and R' are hydrogen or lower alkyl of one to four carbon atoms except that R does not equal R'; a,b,c,d,e and f are from zero to 4 except that the sums a+b, c+d and e+f range from 1 to 4 at a temperature in the range between ambient and 300° C. and at a pressure between atmospheric and 2 atmospheres to produce a mixture of polyols which has an average hydroxyl number in the range between 150 and 600, and b. from about 95 to 0 percent by weight of a nitrogen-containing polyol which is the reaction product from (1) reacting one mole of phenol or nonylphenol with one to two moles of ethanolamine to give a Mannich reaction product, and (2) subsequently reacting one mole of the Mannich reaction product with 2 to 3 moles of propylene oxide.

15. The rigid polyurethane foam of claim 14 in which the polyol blend has a hydroxyl number in the range from 200 to 600.

16. The rigid polyurethane foam of claim 14 in which the blowing agent is trichlorofluoromethane.

17. A rigid polyisocyanurate foam obtained by reacting in the presence of a blowing agent and a trimerization catalyst of polyisocyanurate formation, an organic polyisocyanate and a mixture of aromatic polyols having tertiary amine and ester functionalities which is the reaction product of a residue selected from the group consisting of a dimethyl terephthalate manufacturing residue and a polyethylene terephthalate manufacturing residue, an alkylene glycol and an amino alcohol.

18. The rigid foam of claim 17 in which the blowing agent is trichlorofluoromethane.

* * * * *